US010432093B2

United States Patent
Cheng et al.

(10) Patent No.: US 10,432,093 B2
(45) Date of Patent: Oct. 1, 2019

(54) MULTIPHASE DC-DC CONVERTER WITH CONFIGURABLE CURRENT SHARING AND PHASE MANAGEMENT

(71) Applicant: Texas Instruments Incorporated, Dallas, TX (US)

(72) Inventors: Kuang-Yao Cheng, Bedford, NH (US); Wenkai Wu, East Greenwich, RI (US); Yipeng Su, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/790,868

(22) Filed: Oct. 23, 2017

(65) Prior Publication Data

US 2018/0254706 A1    Sep. 6, 2018

Related U.S. Application Data

(60) Provisional application No. 62/467,526, filed on Mar. 6, 2017.

(51) Int. Cl.
  *G05F 1/00*     (2006.01)
  *H02M 3/158*    (2006.01)
  *H02M 1/084*    (2006.01)

(52) U.S. Cl.
  CPC ......... *H02M 3/1584* (2013.01); *H02M 1/084* (2013.01); *H02M 2003/1586* (2013.01)

(58) Field of Classification Search
  CPC ... G05F 1/12; G05F 1/455; G05F 1/40; G05F 1/42; G05F 1/44; G05F 1/445; G05F 1/16; G05F 1/20; G05F 1/26; H02M 2003/1586; H02M 3/1584; H02M 2007/4815

See application file for complete search history.

(56) References Cited

U.S. PATENT DOCUMENTS

| | | | |
|---|---|---|---|
| 6,683,441 B2 * | 1/2004 | Schiff ................. | H02M 3/1584 323/222 |
| 9,726,697 B2 * | 8/2017 | El-Damak .............. | G01R 19/10 |
| 2005/0200340 A1 * | 9/2005 | Jochum ............... | H02M 3/1584 323/280 |
| 2015/0097542 A1 * | 4/2015 | Repton ............... | H02M 3/1584 323/282 |

* cited by examiner

*Primary Examiner* — Adolf D Berhane
*Assistant Examiner* — Afework Demisse
(74) *Attorney, Agent, or Firm* — Tuenlap Chan; Charles A. Brill; Frank D. Cimino

(57) ABSTRACT

A multiphase DC-DC converter includes a first phase circuit including a higher inductance inductor and a second phase circuit including a lower inductance inductor. An output of the inductors are tied together providing a Vout. A phase manager and current sharing (PMCS) block receives a feedback signal from a feedback network coupled between Vout and the PMCS block that receives current feedback from phase circuits. The PMCS block generates driver control signals at a first time when a load is requesting a lower load current for controlling the phase circuits to operate with a first current sharing ratio to provide the lower load current, and at a second time when the load is requesting a higher load current controls the phase circuits to operate at a second current sharing ratio that is different from the first current sharing ratio having a higher average second phase circuit current.

20 Claims, 11 Drawing Sheets

MULTIPHASE DC-DC CONVERTER WITH CONFIGURABLE CURRENT SHARING AND PHASE MANAGEMENT

CROSS REFERENCE TO RELATED APPLICATIONS

This application claims the benefit of Provisional Application Ser. No. 62/467,526 entitled "HIGH POWER DENSITY AND HIGH EFFICIENCY OF MULTIPHASE DC-DC CONVERTERS WITH TURBO MODE AND THERMAL MANAGEMENT BASED ON CONFIGURABLE CURRENT SHARING RATIOS AND INTELLIGENT PHASE MANAGEMENT", filed Mar. 6, 2017, which is herein incorporated by reference in its entirety.

FIELD

Disclosed embodiments relate to DC-to-DC converters, in particular to multiphase DC-to-DC converters.

BACKGROUND

Multiphase DC-DC power converters are used in many applications, such as for power supplies for personal computers, office equipment, laptop computers, and servers. The DC-DC converter produces a regulated output voltage (Vout) having a magnitude that differs from the input voltage received (Vin). For example, in a computer off-line power supply, a 120 V or 240 V AC utility voltage as the Vin is generally rectified to a DC voltage, then a DC-DC converter that implements switching reduces the rectified voltage to the regulated lower DC voltage required by the processor IC, such around 1 to 2 Volts.

It is common for DC-DC power converters to use same inductance values for each of its plurality of phases. However, the same inductance for each phase may not result in good power conversion efficiency, such as if one needs higher efficiency over a wide load range from light load operation to heavy load operation (e.g., in data center applications) where the loading of the microprocessors can be random based on its Internet client' utilizations across the whole world.

It is known that smaller inductance value inductors provide a faster converter transient response, and that larger inductance values inductors have lower AC losses which provides higher efficiency at light load conditions. A dynamic phase shedding (DPS) concept is known which involves turning completely off one or more of the DC-DC converter's phases which can be employed to reduce the power consumptions at light load conditions.

SUMMARY

This Summary briefly indicates the nature and substance of this Disclosure. It is submitted with the understanding that it will not be used to interpret or limit the scope or meaning of the claims.

Disclosed embodiments recognize for multiphase DC-DC converters there is a known design trade-off between power efficiency and load transient performance (e.g., ripple). Increasing the inductance along with decreasing the switching frequency can increase the overall converter power efficiency, but can also cause degrade the converter's load transient performance, especially for powering processors with high current 'turbo' modes, that can lead to higher costs due to more output capacitors (higher capacitance) required to meet the load transient performance requirements. Moreover, in order to keep the needed phase interleaving among all the phases, conventionally the inductors and power transistors are selected to be the same for each of the phase circuits.

Instead of having the same inductance inductors for all phases, in one embodiment that can be termed a configurable current sharing and phase management embodiment for addressing turbo mode operation, disclosed DC-DC converters have phase circuits that collectively provide at least two different inductance values, such as a first phase circuit(s) including a higher inductance inductor and at least a second phase circuit(s) including a lower inductance inductor. The current sharing ratio is determined by the inductances selected. At a first time when a load is requesting a lower load current, the first phase circuit and second phase circuit are controlled to operate at a first current sharing ratio. At the first time one of the phase circuits can in some embodiments be disabled and the current sharing ratio is thus undefined, such as by disabling the second phase circuit(s) being turbo phases having the relatively low inductance, so that the first phase circuit(s) provides all of the lower load current supplied to the load. At a second time when the load is requesting a higher load current, the first phase circuit and second phase circuit are controlled to operate at a second current sharing ratio that is different from the first current sharing ratio having a higher average current for the second phase (which has the lower inductance inductor) to supply the higher load current to the load.

At light loads to medium loads, the active phases are thus operating with higher inductance and lower switching frequencies to achieve higher efficiency operation. When the load (e.g., processor) requests more current (e.g., when running in turbo mode), other phase(s) with lower inductance are added to ensure proper undershoot performance. Once the load current is reduced in normal operations, the phase(s) with lower inductance can be dropped (i.e. disabled) to provide higher power efficiency.

In another disclosed embodiment that can be termed a thermal management embodiment, the thermal management of the respective power phases can work in conjunction or independently of the configurable current sharing and phase management embodiment for addressing turbo mode operation. For disclosed thermal management, the main concept is to balance the thermal performance (so that the phase temperatures are approximately the same) when even using same inductance in each power phase by dynamically at least one of (i) adjusting the current sharing ratios and ii) the phase sequences based on the phase position in the line of phases to achieve thermal balance among all phases. For example, by applying different current sharing ratios across the various power phases through controlling so there is less current for normally hotter running interior phases and more current for normally cooler running exterior phases, the thermal performance can be better managed across all phases. Therefore, the current sharing ratio in the disclosed thermal management can be selected based on the actual phase placement/layout/airflow, not based on the inductance in the phases themselves.

BRIEF DESCRIPTION OF THE DRAWINGS

Reference will now be made to the accompanying drawings, which are not necessarily drawn to scale, wherein.

DETAILED DESCRIPTION

Figure 1:
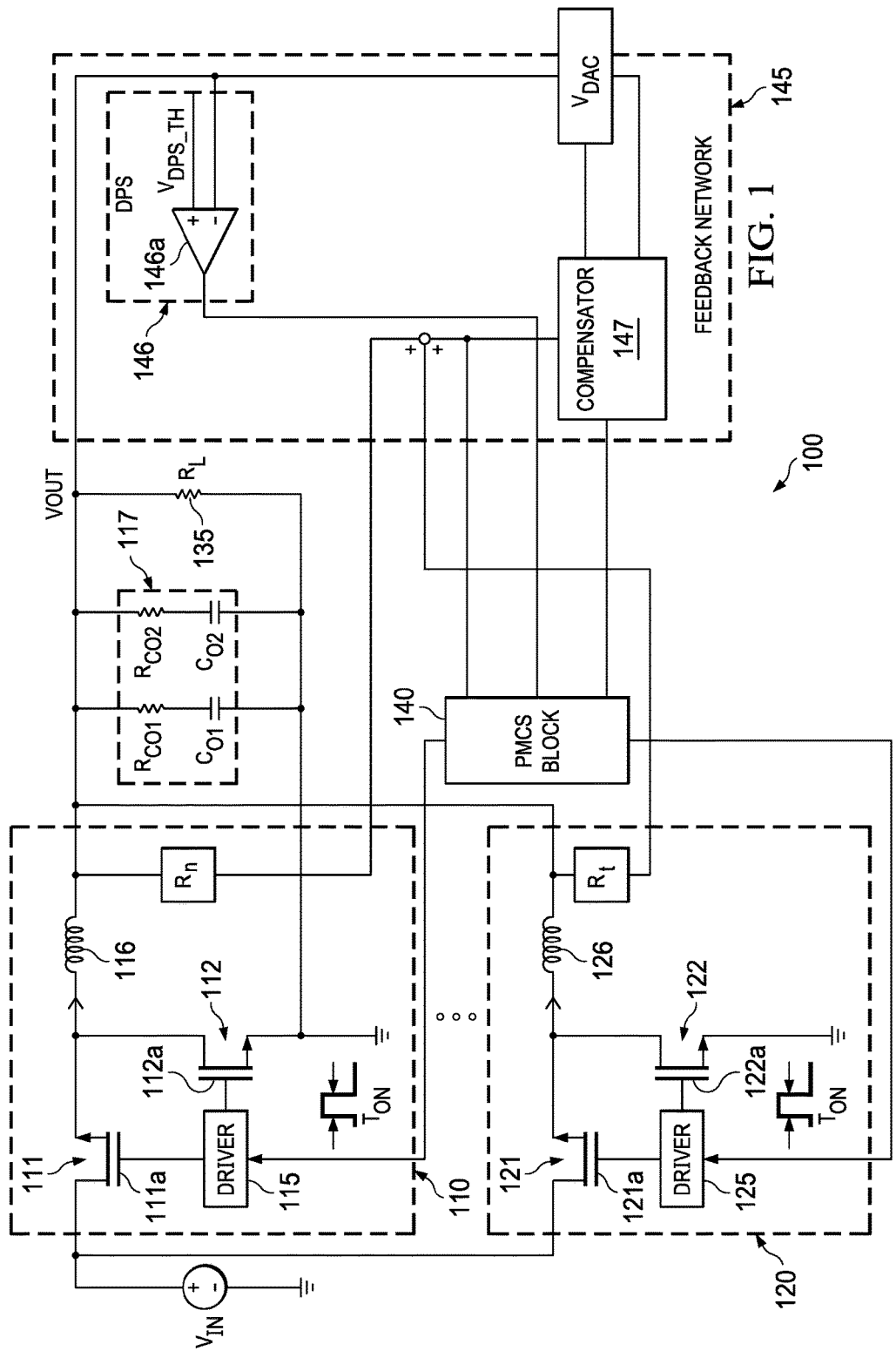
FIG. 1 is a block diagram depiction of a disclosed multiphase DC-DC converter with configurable current sharing ratios and phase management, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a block diagram depiction of an example multiphase DC-DC converter 100 having configurable current sharing ratios and phase management. Disclosed current sharing refers to changing the current level for power phases before and after the current level change based on the requested current level, which is distinct from known DPS where the phases are turned on/off with identical current sharing ratios and the phase sequences are based on the requested current level. The multiphase DC-DC converter 100 includes at least a first phase circuit 110 (e.g., for a normal phase) including a higher inductance inductor 116 and at least a second phase circuit 120 including a lower inductance inductor 126 (e.g., for a higher current turbo phase), each including a switch network comprising at least one power transistor (power transistors 111, 112 for first phase circuit 110 and power transistors 121, 122 for the second phase circuit 120) providing an input node for receiving an input voltage shown as the DC voltage Vin. The higher inductance inductor 116 can have an inductance that is at least double an inductance of the lower inductance inductor 126.

The power transistor 111, 112, 121, 122 can comprise metal-oxide-semiconductor field-effect transistors (MOSFETs). However, other semiconductor power switches such as insulated-gate bipolar transistors (IGBTs), bipolar junction transistors (BJTs), or thyristors can also be used. The power transistors each have a control node (111a, 112a, 121a, 122a, being gates for the MOS power transistors) that are coupled to receive respective driver control signals from a first driver 115 (e.g. PWM driver) for driving the first phase circuit 110 and a second driver 125 for driving the second phase circuit 120. An output of the inductors 116, 126 are both tied together and in series with at least one shared capacitor 117 (typically an RC network) to ground for providing a low pass filter output node (Vout) in between, where Vout is adapted to drive a load shown in FIG. 1 as $R_L$ 135.

A phase manager and current sharing (PMCS) block 140 has an input coupled to receive an input from a feedback network 145 that comprises a dynamic phase shedding (DPS) block 146 and a loop compensator block 147 that are both coupled between Vout and the PMCS block 140. The feedback network 145 receives current feedback from the first phase circuit 110 shown via a resistor shown as Rn (n for normal) and generally a different current feedback value from the second phase circuit 120 via a resistor shown as Rt (t for turbo) because Rn and Rt are typically different resistance values.

The PMCS block 140 is for generating a first driver control signal coupled to an input of the first driver 115, and a second driver control signal coupled to an input of the second driver 125. The feedback supplied to the PMCS block 140 includes an output from the loop compensator block, operating phase numbers from the DPS block 146, and the current feedbacks through Rn and Rt, where as described above Rn and Rt are generally different values to provide different current feedback gains, where as described below Rt is typically <Rn.

The on-chip portions of the multiphase DC-DC converter 100 generally comprise Rn and Rt, the PMCS block 140, the feedback network 145, the DPS block 146 and a loop compensator block 147, while the drivers 115, 125, and power transistors 111, 112, 121, 122 are generally provided by a separate IC. The inductors 116, 126, and capacitor 117 will generally be off-chip (e.g., on a common printed circuit board (PCB) for the DC-DC converter).

When there are different L values for the respective phases of a multiphase DC-DC converter, such as for the multiphase DC-DC converter 100, the Vout current ripple is different for the respective phases that tend to cause a Vout phase interleaving problem. By implementing disclosed different current sharing gains to have essentially the same amount of current ripples seen by the PMCS block 140 acting as a controller provides better phase interleaving.

PMCS block 140 can be implemented with hardware (e.g., a state machine or by operational amplifiers) or by firmware. The DPS block 146 can be implemented in firmware or in hardware, and generally includes at least one comparator with comparator 146a shown in FIG. 1 comparing Vout and a threshold voltage level shown as $V_{DPS\_TH}$, which can be programmed and stored in a memory device based on the undershoot requirements for load transient performance. It is noted that the current feedback gains for the multiphase DC-DC converter 100 being different is not believed to be known for multiphase DC-DC converters.

The PMCS block 140 is for generating the driver control signals that are coupled to inputs of the drivers 115, 125 for at a first time when the load $R_L$ 135 is requesting a lower load current, and controlling the first phase circuit 110 and second phase circuit 120 to operate at a first current sharing ratio to provide the lower load current. The first current sharing ratio can be a defined value based on non-zero currents for both the first phase circuit 110 and second phase circuit 120, or can be undefined with the first phase circuit 110 operating at a non-zero current level and the second phase circuit 120 disabled (and thus operating at a zero current). At a second time when the load $R_L$ 135 is requesting a higher load current, the first phase circuit 110 and second phase circuit 120 are controlled to operate at a second current sharing ratio that is different from the first current sharing ratio having a higher average current for the second phase circuit to provide the higher load current. The second current sharing ratio is a defined value based on non-zero currents for both the first phase circuit 110 and second phase circuit 120.

The current feedback ratios from the normal phases such as first phase circuit 110 (with one normal phase being shown in FIG. 1 for simplicity) with an inductance $L_{normal}$ are configured by using $R_n$. The current feedback ratios from the turbo phases such as second phase circuit 120 (with one turbo phase being shown in FIG. 1 as the second phase circuit 120 for simplicity) with inductance $L_{turbo}$ are configured using $R_t$ to be different from the normal phases, where in one embodiment Rt is set by the following example equation:

$$Rt = (L_{turbo}/L_{normal}) \times Rn.$$

However, Rn and Rt can be set by a different equation. Turbo boost is known in the art to be a technology for processors that enables a processor to run above its base operating frequency via dynamic control of the processor's clock rate, thus requiring more power supply current. Besides the current sharing ratios being adjusted based on the level of load current requested, the phase assignments for the normal phase(s) and turbo (higher current) phase(s) can also be adjusted based on disclosed phase management with control signals from PMCS block 140 to the drivers 115, 125 to reduce the input/output current ripple that would be otherwise caused by unbalanced inductance.

Figure 2:
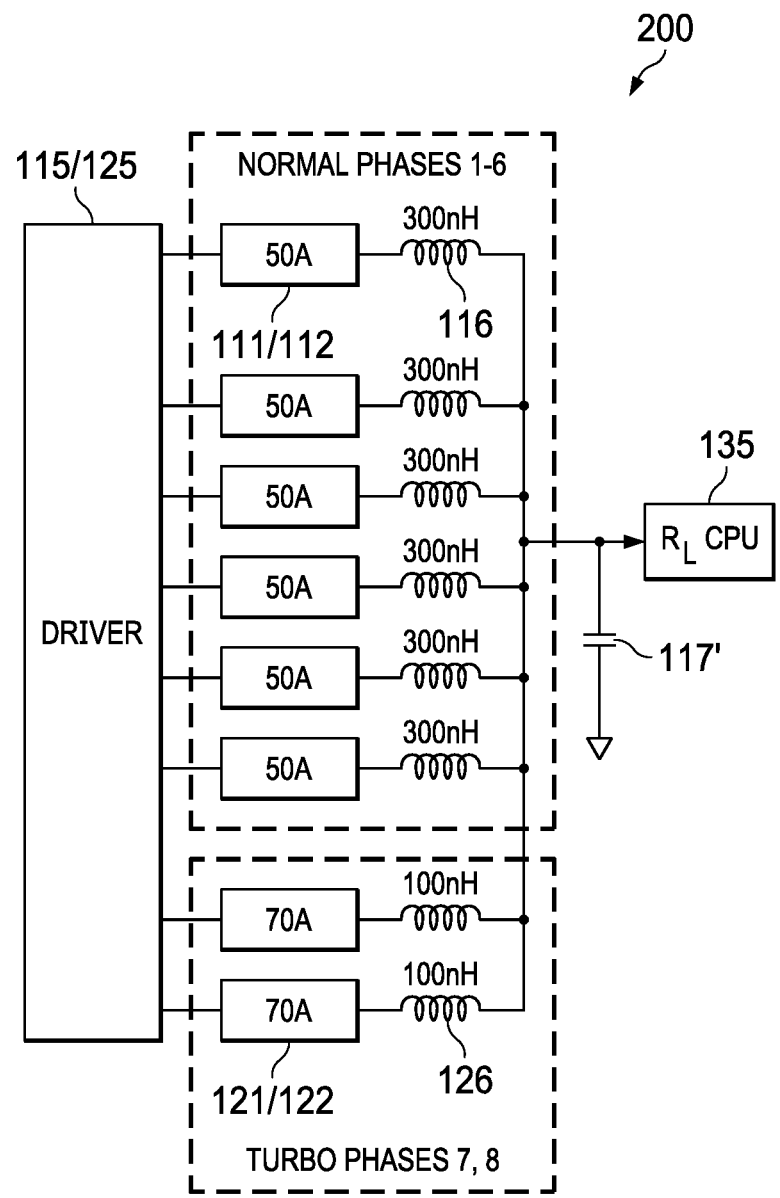
FIG. 2 is a depiction of a 8-phase DC-DC converter with phases with lower value inductance for the turbo phases and normal value inductance for other phases, with the normal value inductance shown by example as being 300 nH for the normal phases running at 50 A and the lower value inductance shown as 100 nH for the turbo phases running at 70 A, according to an example embodiment.

FIG. 2 illustrates a 8-phase DC-DC converter 200 with turbo phases shown as phases 7 and 8 and normal phases 1 to 6, shown by example as 300 nH for inductors 116 for the normal phases 1 to 6 controlled to run at 50 A and a lower inductance shown as 100 nH for the inductors 126 for the turbo phases 7, 8 running at 70 A. The output capacitor(s) is shown as 117'. A conventional DC-DC converter in contrast for the same CPU load application would have all the same inductances (e.g., 150 nH) with all phases 1-8 all controlled to run at the same current, such as 70 A for all of these phases. The current feedback resistors (Rn and Rt), feedback network 145, and PMCS block 140 each in FIG. 1 are provided in DC-DC converter 200, but are not shown in FIG. 2 for simplicity.

As described above, the PMCS block 140 can also control phase assignments to implement mixed phase turn ons. With the phase control provided by PMCS block 140, phase assignments of the DC-DC converter 200 are controlled so that a phase turn on sequence for reaching a higher load current comprises turning on at least one of the plurality of lower inductance phase circuits (e.g., turbo phases) before turning on at least one the plurality of higher inductance phase circuits (e.g., normal phases). For example, for DC-DC converter 200 with phases 1 to 6 normal and phases 7 and 8 turbo, the turn on sequence may be 1, 2, 3, 7 (a turbo phase), 4, 5, 6, 8 (the other turbo phase). The phase turn on sequence algorithm run by the PMCS block 140 can take the total phase numbers of normal phases and turbo phases, and then find the best sequence to insert one or more turbo phases into the normal phases in the turn on sequence for better phase interleaving with reduced input/output ripple.

By disclosed DC-DC converters utilizing adjustable current sharing ratios and phase assignments responsive to changes in requested load currents, several significant benefits are achieved. These benefits include:

1. Higher power efficiency when operating at light loads to medium loads by only activating the normal phases with higher inductance (when the turbo phase(s) are disabled).

2. The load transient performance (see Examples below; low ripple shown for disclosed DC-DC converters) can be maintained similar to conventional DC-DC converter solutions without additional costs of output capacitors through different current sharing gains to have the same amount of current ripples seen by the PMCS block 140 acting as a controller, and to have the DPS block 146 to add the turbo phases faster.

3. The power transistors 111, 112, 121, 122 can also be scaled with a smaller size for the normal phases to have better power density due to smaller packages and to have lower costs for the total converter system. For example, in the 8-phase design example, the power stages and inductors of the 6 normal phases can be smaller due to lower current sharing ratios.

Disclosed embodiments also include thermal management embodiments that recognize conventionally the power phases physically placed in and near the middle of the multiphase DC-DC converter's line of power phases will be the hottest converter phases during operation, which can also degrade the converter's efficiency and reliability, particularly for high power density converter applications. Disclosed thermal management embodiments for multiphase DC-DC converters dynamically at least one of (i) adjust the current sharing ratios and ii) the phase sequences based on the phase position in the line of phases to achieve thermal balance among all phases, instead of only the current balance as described above. Dynamically adjusting the current sharing ratios and/or the phase sequences helps to further improve the DC-DC converter's efficiency by balancing the thermal performance. For disclosed thermal management embodiments as described above all phases can have the same inductance, or there can be different inductances in some of the respective phases. Disclosed thermal management embodiments can also be used to improve the power density by enabling utilizing low-current power stages and smaller inductors thus with a smaller footprint.

Disclosed thermal management embodiments also recognize in known multiphase DC-DC converters the individual phase currents are generally balanced in order to avoid over-stressing the power stages of some of the phases. However, with a conventional current balance it is recognized that the temperature of the power FETs and the inductors in the phases will not be balanced due to their layout placements. Disclosed thermal management embodiments for multiphase DC-DC converters solve this problem by adjusting the current sharing and/or the phase sequences to allow the power FETs and inductors of the phases placed in the middle locations to carry lower currents as compared to the phases placed in the outer locations.

EXAMPLES

Disclosed embodiments are further illustrated by the following specific Examples, which should not be construed as limiting the scope or content of this Disclosure in any way.

Figure 3A:
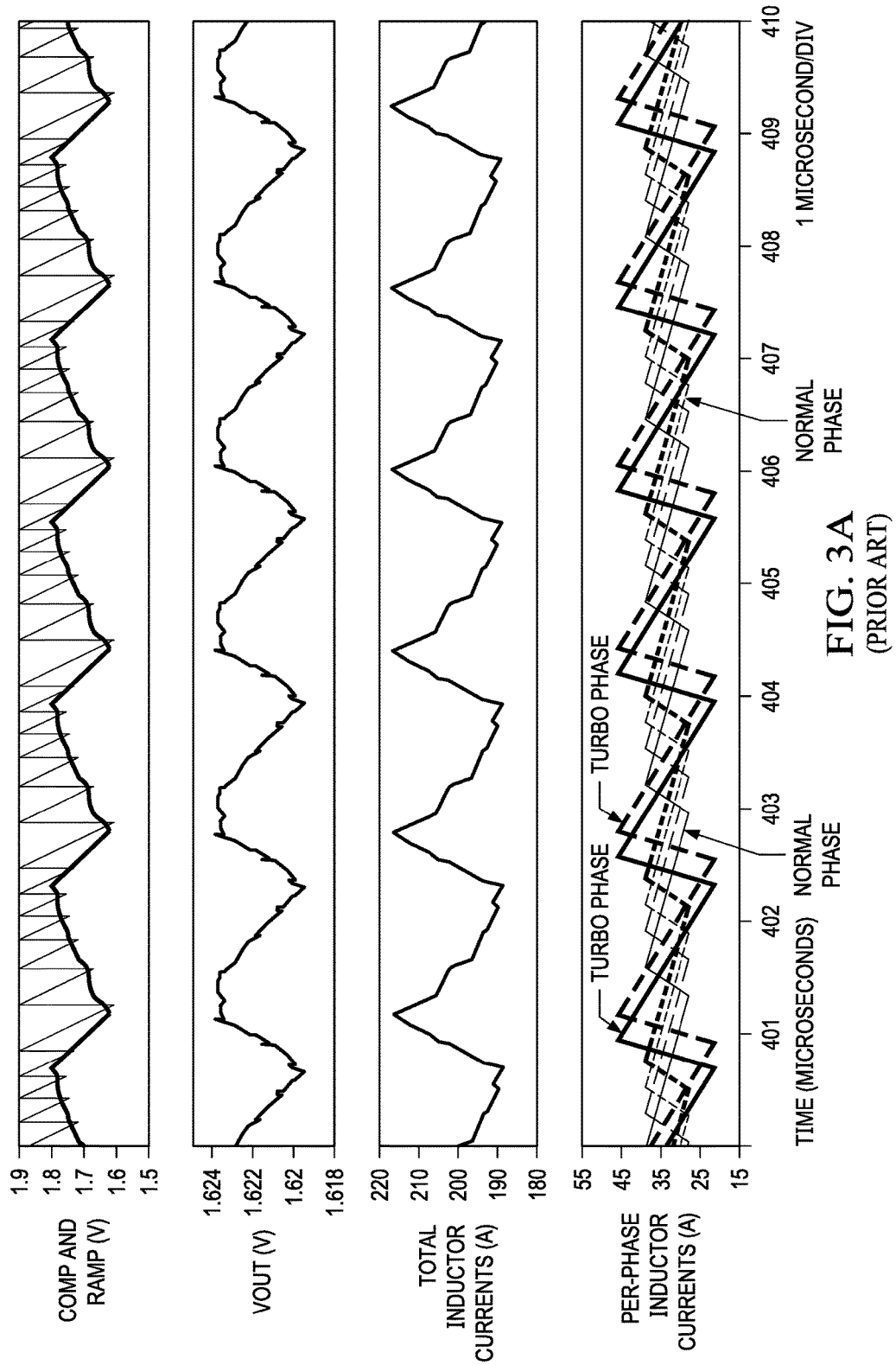
FIGS. 3A and 3B show a comparison of a steady-state simulation for an 8 phase DC-DC converter based on the 8-phase DC-DC converter shown in FIG. 2 without disclosed phase management shown in FIG. 3A, and with disclosed phase management shown in FIG. 3B.
Figure 3B:
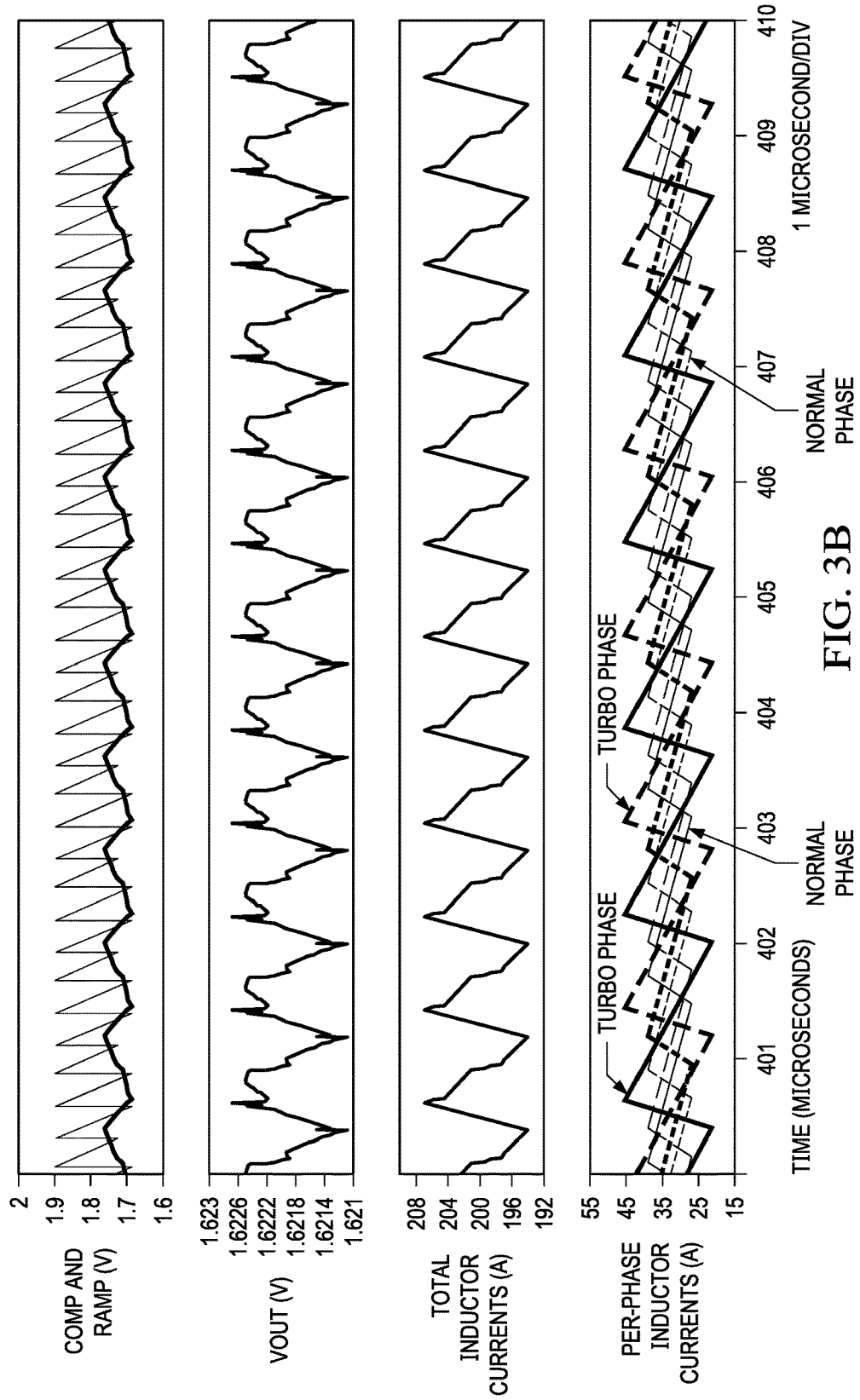

FIGS. 3A and 3B show a comparison of a steady-state simulation for an 8 phase DC-DC converter based on 8-phase DC-DC converter 200 shown in FIG. 2 with normal phases 1 to 6 and turbo phases 7 and 8 without disclosed phase management shown in FIG. 3A, and with disclosed phase management shown in FIG. 3B. Rt=Rn=5 mohm. Parameters shown are the individual inductor currents at the bottom, the total inductor current, Vout, and the comp and ramp signals from a compensator including a ramp, such as the compensator 147 in FIG. 1 at the top. As shown in FIG. 3A, if the turbo phases 7 and 8 are activated sequentially (after the normal phases) as with conventional DC-DC converter solutions, then the output voltage ripple and the input/output current ripple will be relatively large due to poor ripple cancellation. By using disclosed phase management that inserts the turbo phases 7 between normal phases 1 to 6 in the phase activation sequence as shown in FIG. 3B it can be seen to help improve the ripple cancellation and thus the output waveform shown as Vout. The specific phase activation sequence used for the simulation of FIG. 3B shown was 1, 2, 3, 7, 4, 5, 6, 8.

Figure 4:
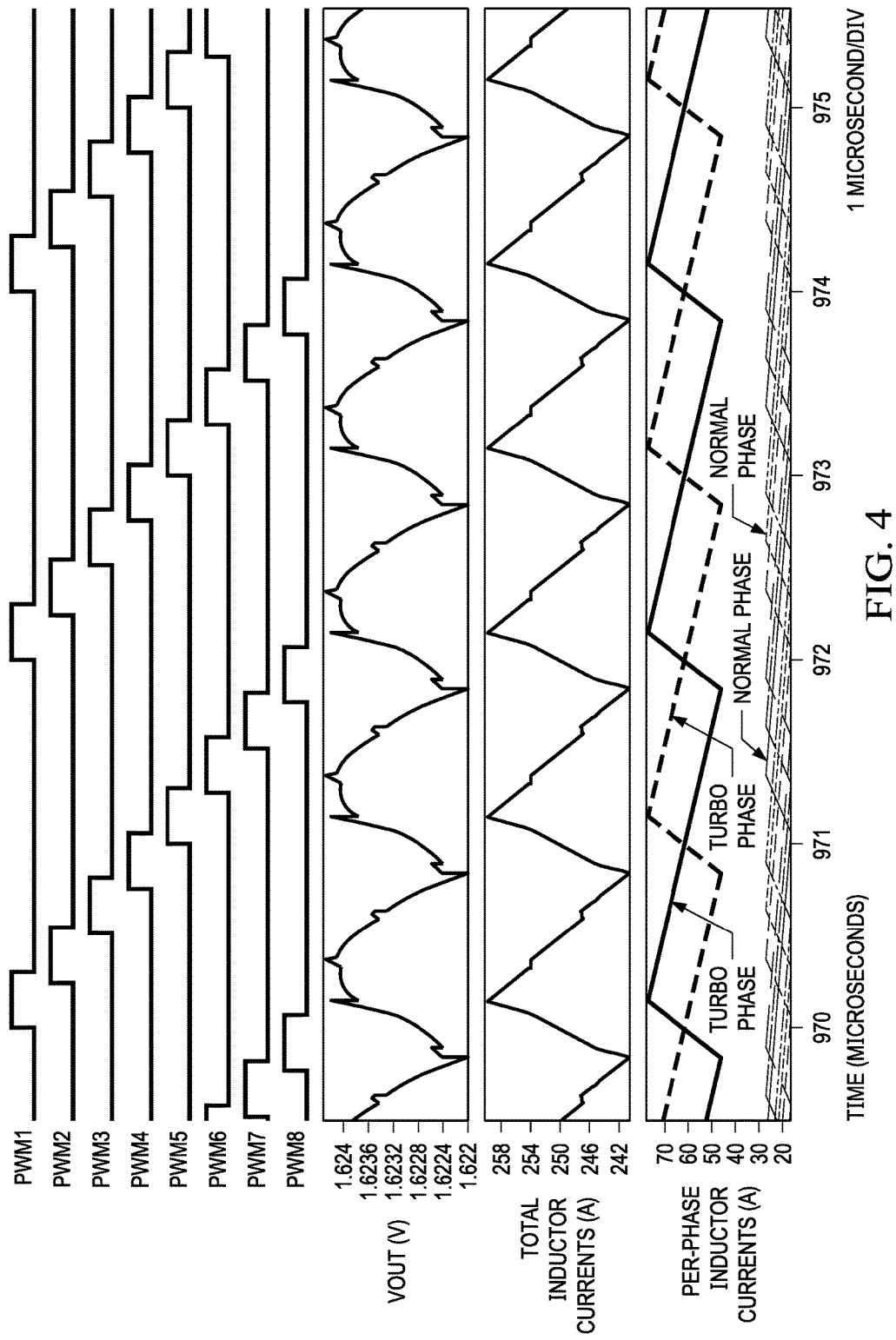
FIG. 4 shows steady-state simulation waveforms for the 8-phase DC-DC converter shown in FIG. 2 having configurable current sharing ratios and phase management.

FIG. 4 shows steady-state simulation waveforms for the 8-phase DC-DC converter 200 shown in FIG. 2 having normal phases 1-6 and turbo phases 7, 8, and having configurable current sharing ratios and phase management. Rt was <Rn, in this case Rt=5/3 mohm and Rn=5 mohm. The phase activation sequence provided by the PWM signals shown used for the simulation shown was 1, 2, 3, 7, 4, 5, 6, 8. Higher average currents will be carried for the turbo phases (7, 8) and the Vout voltage ripple is seen to be acceptable due to better phase management.

Figure 5A:
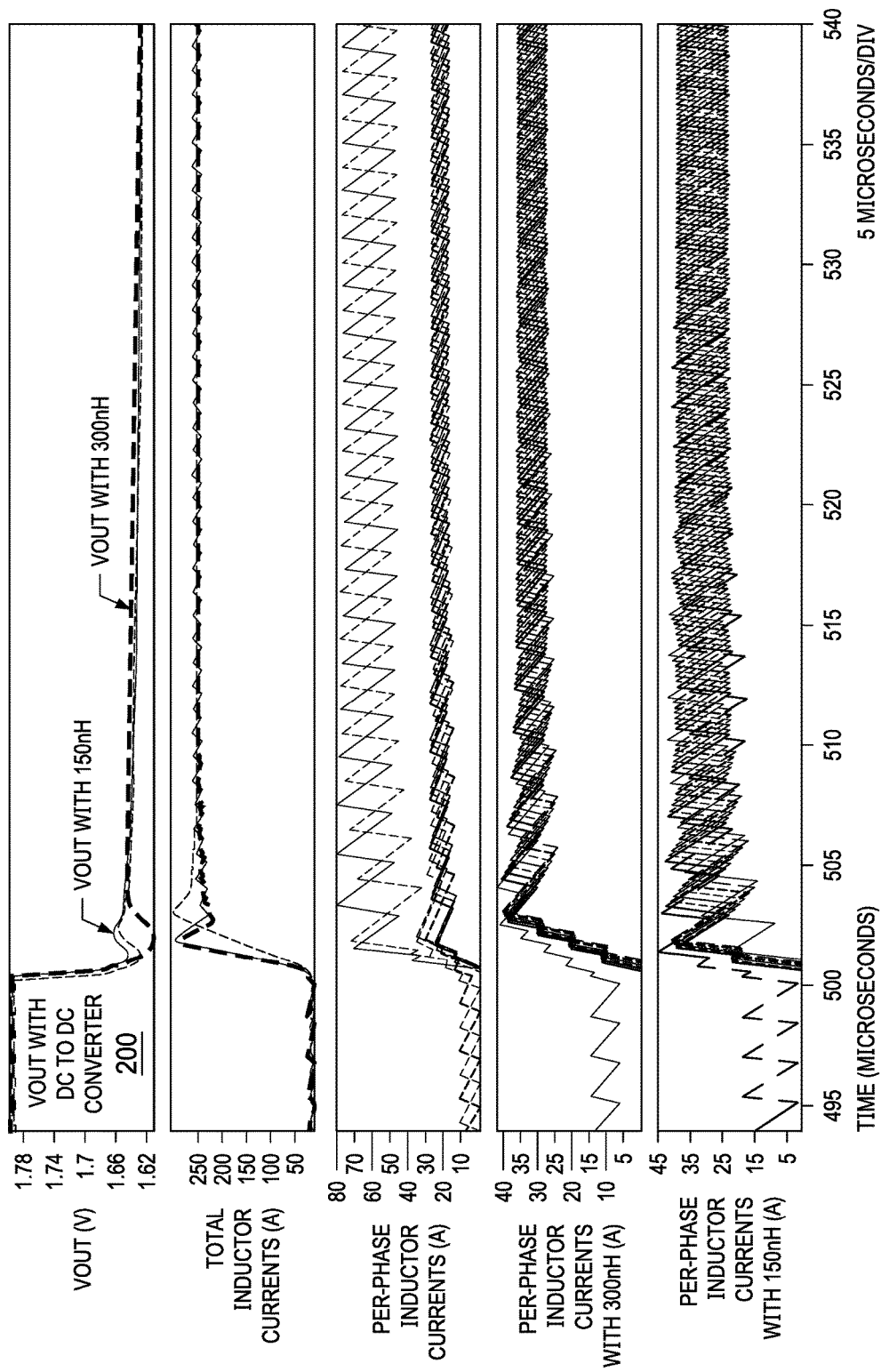
FIGS. 5A and 5B show load transient performance comparisons for the 8-phase DC-DC converter shown in FIG. 2 with configurable current sharing ratios and phase management, and a conventional DC-DC converter lacking configurable current sharing ratios and phase management having all the same inductance values (L=150 nH all in one case and L=300 nH all in the other case) for its respective phases, with FIG. 5A showing step-down converter performance and FIG. 5B showing step-up converter performance.
Figure 5B:
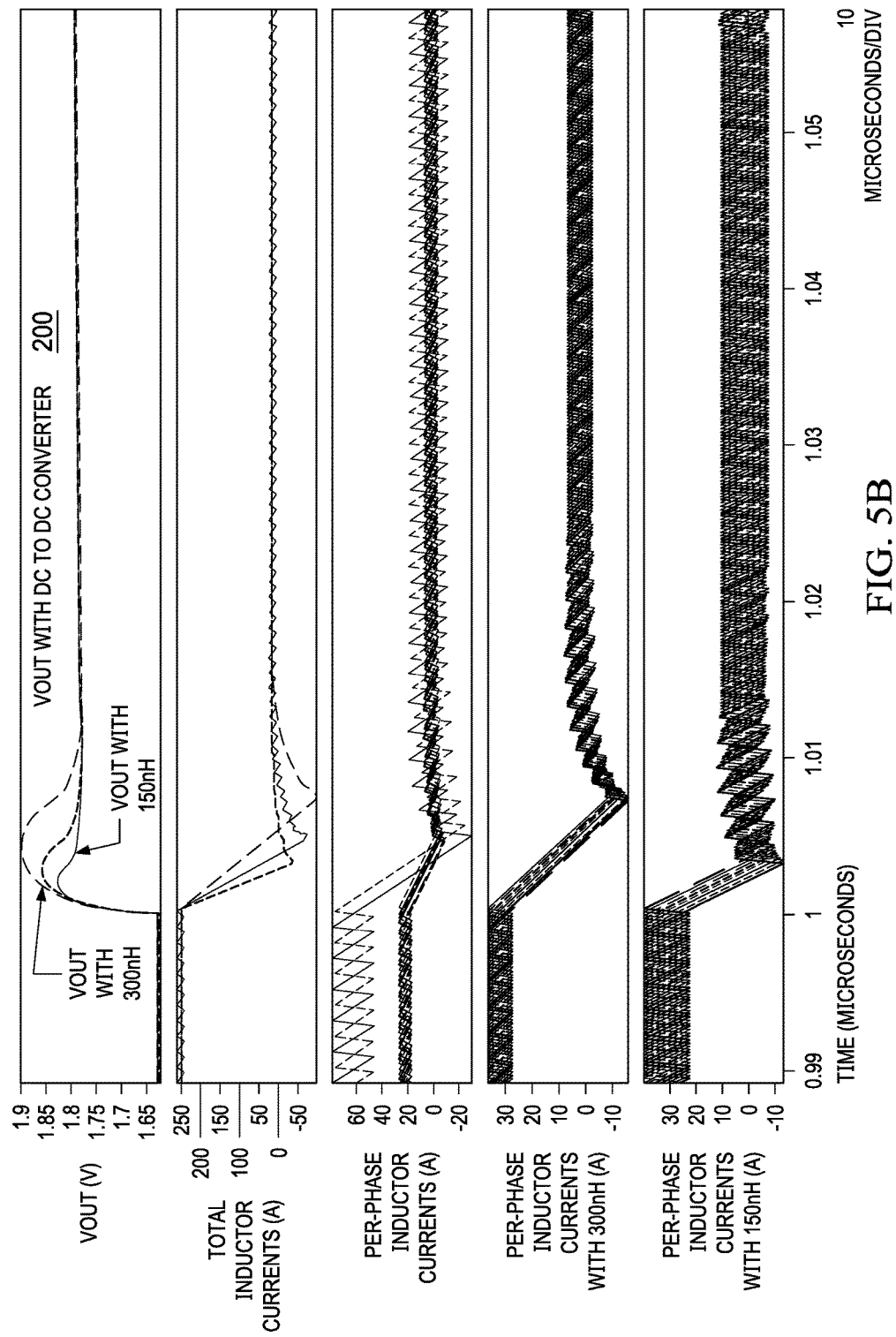

FIGS. 5A and 5B shows the load transient performance comparisons for the 8-phase DC-DC converter 200 shown in FIG. 2 having normal phases 1 to 6 and turbo phases 7, 8 with configurable current sharing ratios and phase management, and a conventional DC-DC converter lacking configurable current sharing ratios and phase management and having all the same inductance values for its 8 phases. FIG. 5A shows a 10 A to 250 A load step-up @ 800 A/μs; and FIG. 5B shows a 250 A to 10 A load step-down @−800 A/μs providing a load transient performance comparison with the disclosed DC-DC converter by mixing 100 nH and 300 nH inductances and the conventional solutions with either all 150 nH or all 300 nH inductances. By using a disclosed DC-DC converter solution, the load transient performance is improved from the conventional DC-DC converter solution with all 300 nH, and can achieve better efficiency compared to the conventional solution with all 150 nH inductors. In addition, the turbo phases can be activated more quickly and to carry higher currents during the load step-ups due to the disclosed configurable current sharing ratios and phase management.

Figure 6:
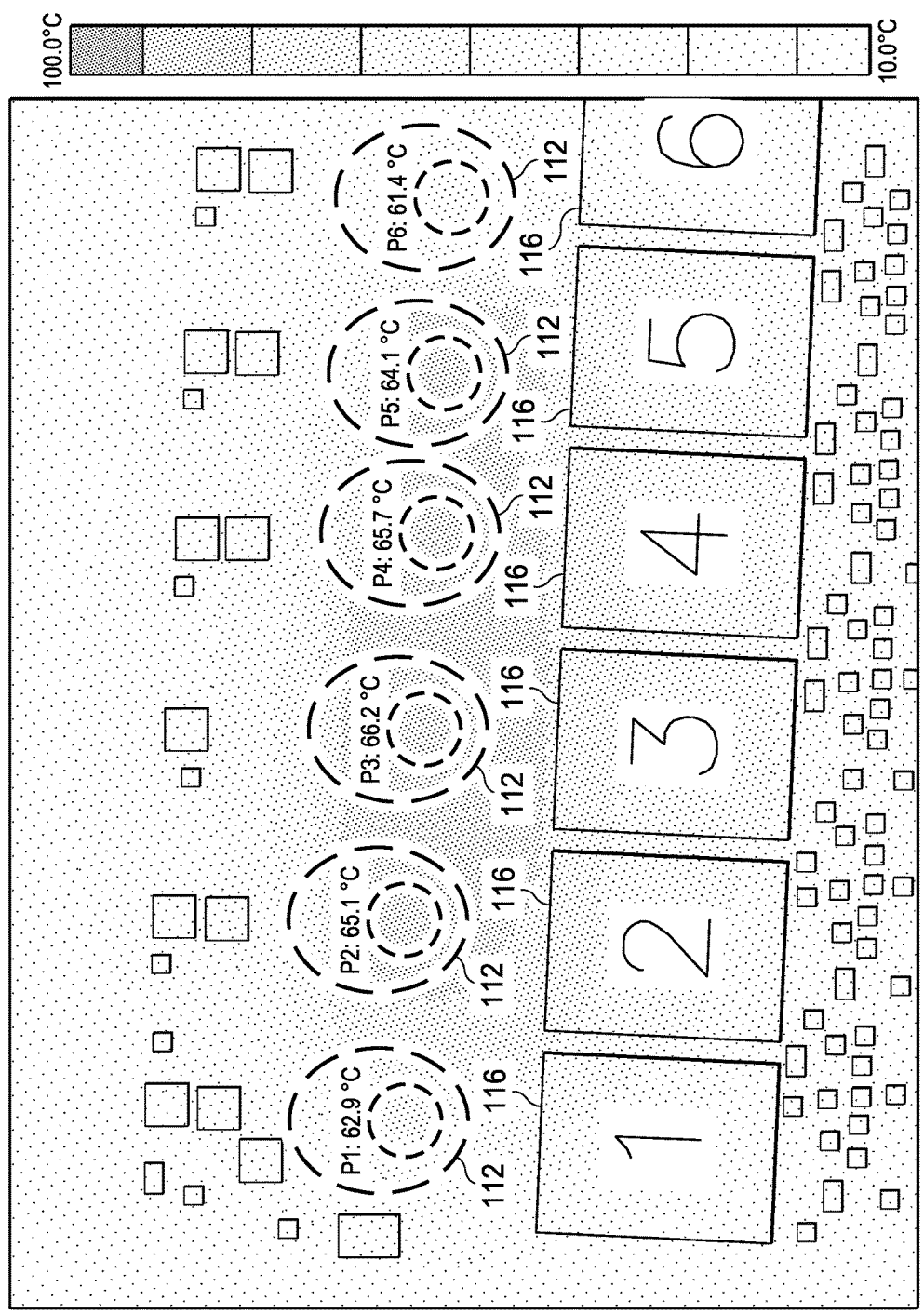
FIG. 6 illustrates a thermal image representation for a known a 6-phase DC-DC converter with all the phases having the same inductance running at 108 A without airflow provided that shows there is almost 5° C. difference between the hottest converter phases and the coolest converter phases.

FIG. 6 illustrates a thermal image representation for a known a 6-phase DC-DC converter with all power phases having the same inductance running at a total current of 108 A without airflow that shows there is almost 5° C. difference between the hottest phases (phase 3 and 4 around 66° C.) and the coldest phases (phases 1 and 6 around 62° C.). To represent the location of the heat generating elements in the respective phases the inductors 116 are shown as a block and the power transistors 112 by an ellipse, with the hottest region being around the power transistors 112. The other operating conditions were an ambient temperature of 25° C., 12 V Vin, 1.8 V Vout, and a switching frequency of 600 kHz. This significant temperature difference between the power phases as shown in FIG. 6 can lead to a higher Rds for the power transistors 112 when they comprise MOS transistors and higher DC Resistance (DCR) of the inductors 116 for the hotter power phases 3 and 4, which can each degrade the overall efficiency and the performance of the DC-DC converter.

Figure 7:
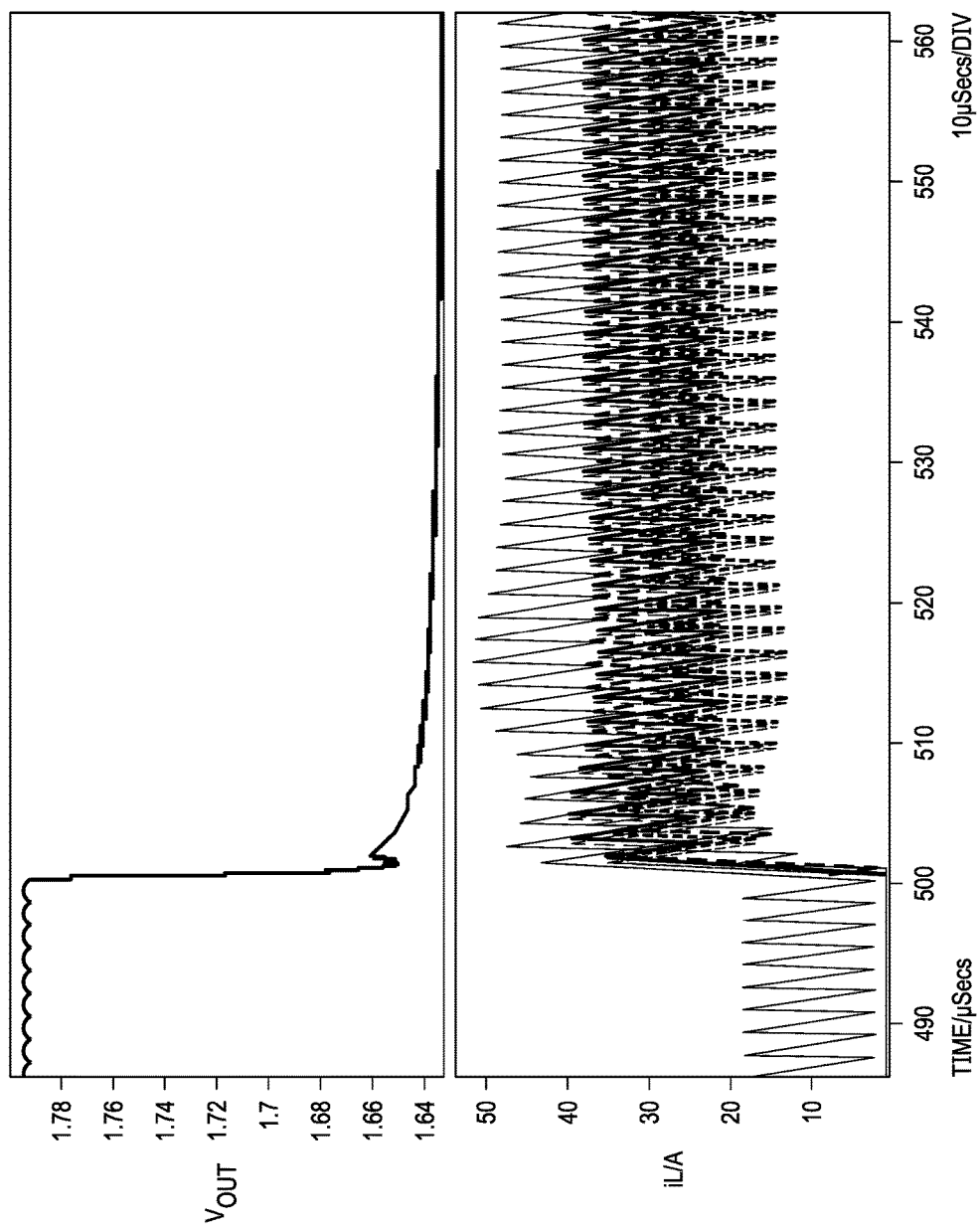
FIG. 7 shows the simulation waveform of the phase currents with different current sharing ratios for the DC-DC converter described relative to FIG. 6.

By using the disclosed thermal management in this example one can reconfigure the phase currents to have the otherwise cooler running outside located phases (phase 1 and 6 in this example) running with 20% higher currents as compared to the otherwise hotter running inside located phases (phase 3 and 4 in this example). The phase sequence can also be adjusted to have phase 3 and 4 become as phase 5 and 6 to be dropped earlier with dynamic phase shedding, then it can achieve a thermal balance instead of a current balance. FIG. 7 shows the simulation waveform of the phase currents (in Amps) with different current sharing ratios for the DC-DC converter described relative to FIG. 6 which as described above all had the same phase inductance values. The load transient performance can be seen to be maintained well since the total phase currents are still well-controlled to deliver the required energy to the load. The Vout waveform is also shown at the top of FIG. 7.

Figure 8A:
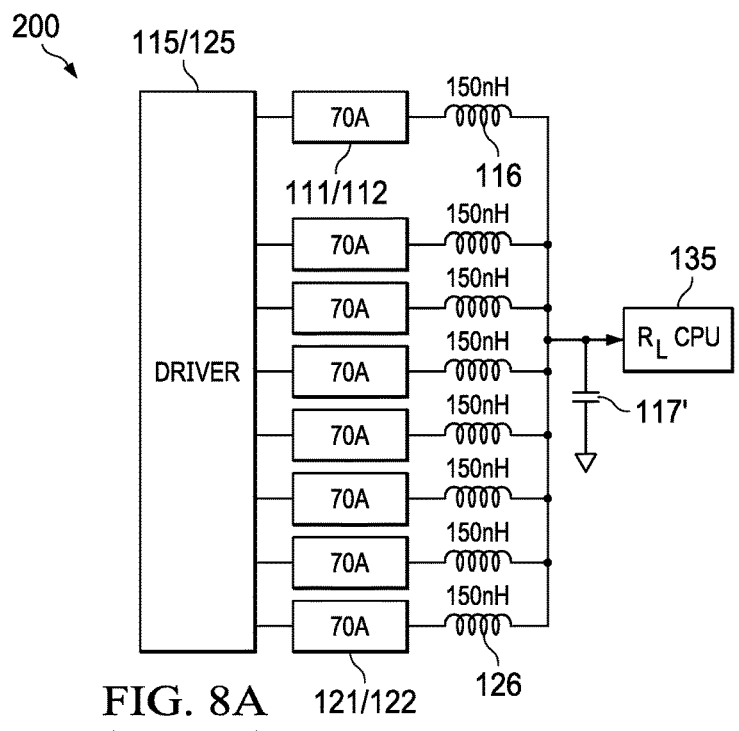
FIG. 8A illustrates comparisons between a conventional 8-phase DC-DC converter with all phases with the same inductance and FIG. 8B which shows a disclosed DC-DC converter with higher power density by adjusting the current sharing ratios to enable using smaller packages of inductors and power stages with lower current ratings.
Figure 8B:
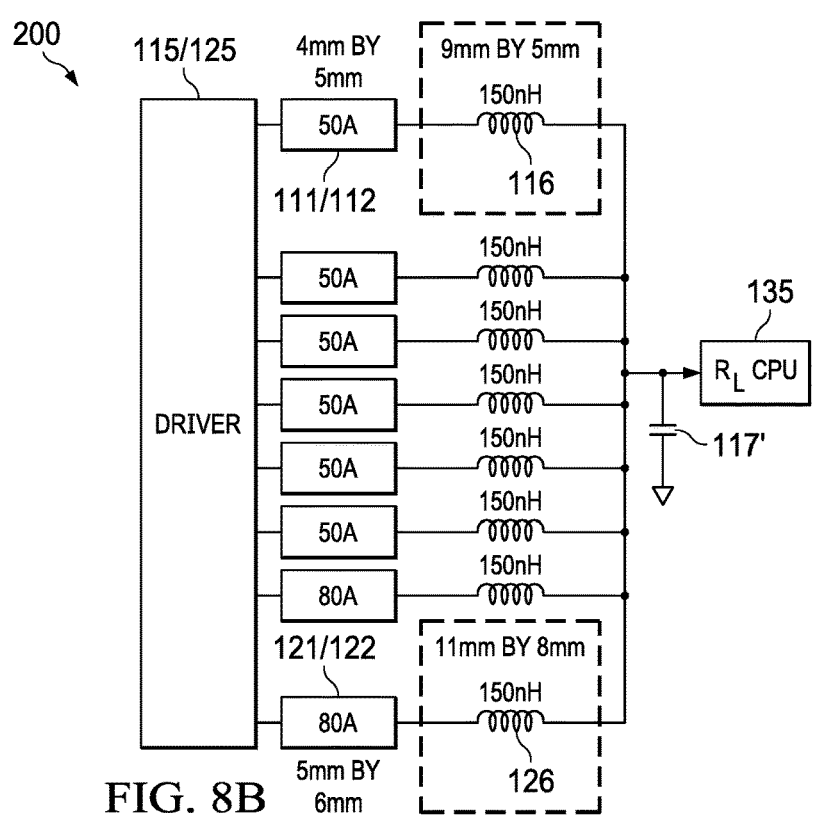
Figure 9A:
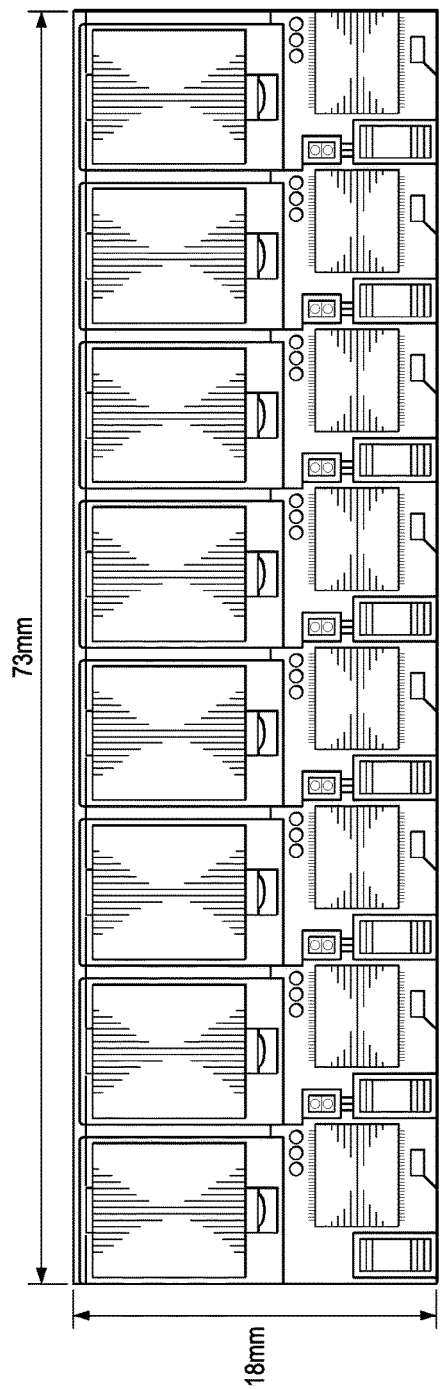
FIG. 9A shows placements for a conventional 8-phase DC-DC converter and FIG. 9B placements for a disclosed 8-phase DC-DC converter placement that achieves a >25% power density improvement compared to the conventional 8-phase DC-DC converter while achieving similar power levels.
Figure 9B:
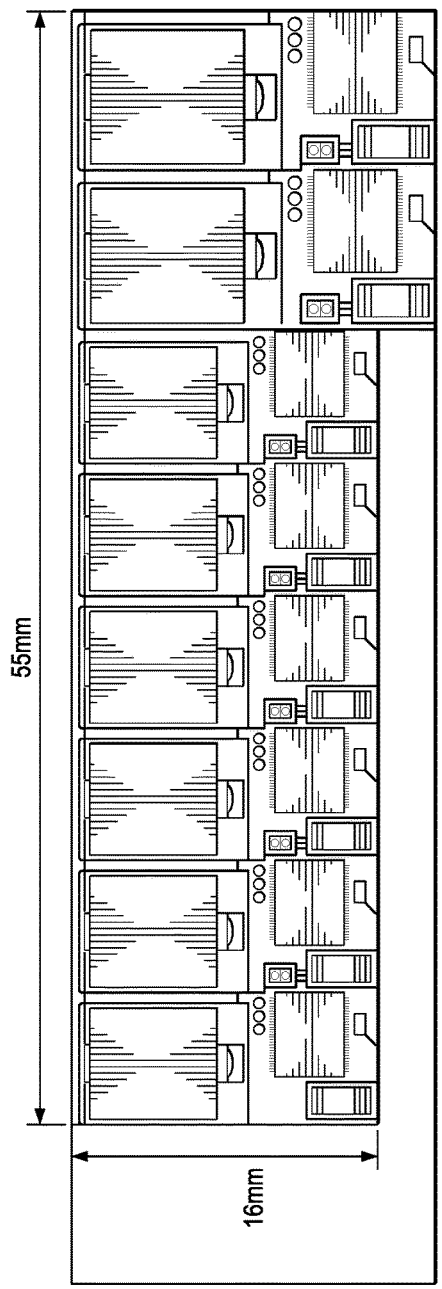

This same disclosed thermal management technique can also be used to improve the power density of the DC-DC converter. FIG. 8A illustrates comparisons between a conventional 8-phase DC-DC regulator with all phases having the same inductance and FIG. 8B illustrating a disclosed 8-phase DC-DC converter with higher power density by adjusting the current sharing ratios to enable using smaller packages of inductors and power stages with lower current ratings. FIG. 9A shows placements for a conventional 8-phase DC-DC converter and FIG. 9B placements for a disclosed 8-phase DC-DC converter placement that achieves a >25% power density improvement compared to the conventional 8-phase DC-DC converter while achieving similar power levels. Power inductors are shown at the top and power transistors near the bottom.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A device comprising:
   an input terminal;
   an output terminal;
   a first phase circuit having a first switch coupled to the input terminal, a first inductor having a first inductance, and coupled between the first switch and the output terminal, and a first current sense resistor coupled to the first inductor; and
   a second phase circuit having a second switch coupled to the input terminal, a second inductor having a second inductance less than the first inductance, and coupled between the second switch and the output terminal, and a second current sense resistor coupled to the second inductor,
   wherein the first current sense resistor has a greater resistance than the second current sense resistor.

2. The device of claim 1, wherein:
   the first phase circuit is operable to conduct a first current between the input terminal and the output terminal during a first phase; and
   the second phase circuit is operable to conduct a second current between the input terminal and the output terminal during a second phase, the second current is greater than the first current.

3. The device of claim 1, further comprising:
   a control circuit coupled to the output terminal, and configured to selectively enable the first phase circuit or the second phase circuit based on a load current detected from the output terminal.

4. The device of claim 3, wherein:
   the first current sense resistor is coupled between the first inductor and the control circuit; and
   the second current sense resistor is coupled between the second inductor and the control circuit.

5. The device of claim 4, wherein the first inductance defines a first ratio over the second inductance, the first resistor defines a second ratio over the second resistor, the first ratio tracks the second ratio.

6. The device of claim 3, wherein the controller is configured to:
   detect a transition from a first load current to a second load current higher than the first load current by a predetermined threshold;
   disable the first phase circuit when the transition is detected; and
   enable the second phase circuit when the transition is detected.

7. The device of claim 3, wherein the controller is configured to:
   detect a transition from a second load current to a first load current lower than the second load current by a predetermined threshold;
   disable the second phase circuit when the transition is detected; and
   enable the first phase circuit when the transition is detected.

8. The device of claim 1, wherein the first inductance is at least three times of the second inductance.

9. The device of claim 1, wherein:
   the first phase circuit includes;
      a first driver circuit configured to receive a first pulse width modulation (PWM) signal corresponding to a first current to be conducted by the first phase circuit; and
      the first switch including:
         a first transistor coupled between the input terminal and the first inductor, and having a first control terminal coupled to the first driver circuit; and
         a second transistor coupled between the first inductor and a ground terminal, and having a second control terminal coupled to the first driver circuit; and
   the second phase circuit includes;
      a second driver circuit configured to receive a second PWM signal corresponding to a second current to be conducted by the second phase circuit; and
      the second switch including:
         a third transistor coupled between the input terminal and the second inductor, and having a third control terminal coupled to the second driver circuit; and
         a fourth transistor coupled between the second inductor and the ground terminal, and having a fourth control terminal coupled to the second driver circuit.

10. A multiphase power converter comprising:
    an input terminal;
    an output terminal;
    a first number of normal phase circuits, each having a first sense resistor, and a first inductor coupled to the first sense resistor, and configured to conduct a first current between the input and output terminals when a corresponding one of the normal phase circuits is activated, the first inductor having a first inductance; and
    a second number of turbo phase circuits, each having a second sense resistor, and a second inductor coupled to the second sense resistor, and configured to conduct a second current between the input and output terminals when a corresponding one of the turbo phase circuits is activated, the second inductor having a second inductance less than the first inductance,
    wherein the first current sense resistor has a greater resistance than the second current sense resistor.

11. The converter of claim 10, wherein the first number is greater than the second number.

12. The converter of claim 10, wherein the first number is at least three times of the second number.

13. The converter of claim 10, wherein the second current is greater than the first current.

14. The converter of claim 10, wherein the first inductance is at least three times of the second inductance.

15. A multiphase power converter comprising:
    an input terminal;
    an output terminal;
    a first number of first phase circuits, each having a first inductor configured to conduct a first current between the input and output terminals when a corresponding one of the first phase circuits is activated, the first inductor having a first inductance;
    a second number of second phase circuits, each having a second inductor configured to conduct a second current between the input and output terminals when a corresponding one of the second phase circuits is activated, the second inductor having a second inductance less than the first inductance; and
    a control circuit coupled to the output terminal, and configured to:
       detect a transition from a first load current to a second load current higher than the first load current by a predetermined threshold;
       disable the first number of first phase circuits when the transition is detected; and enable only one of the second number of second phase circuits when the transition is detected.

16. The converter of claim 15, wherein the first number is greater than the second number.

17. The converter of claim 15, wherein the first inductance is at least three times of the second inductance.

18. A multiphase power converter comprising:
an input terminal;
an output terminal;
a first number of first phase circuits, each having a first inductor configured to conduct a first current between the input and output terminals when a corresponding one of the first phase circuits is activated, the first inductor having a first inductance;
a second number of second phase circuits, each having a second inductor configured to conduct a second current between the input and output terminals when a corresponding one of the second phase circuits is activated, the second inductor having a second inductance less than the first inductance; and
a control circuit coupled to the output terminal, and configured to:
detect a transition from a second load current to a first load current lower than the second load current by a predetermined threshold;
disable the second number of second phase circuits when the transition is detected; and
enable only one of the first number of first phase circuits when the transition is detected.

19. The converter of claim 18, wherein the first number is greater than the second number.

20. The converter of claim 18, wherein the first inductance is at least three times of the second inductance.

* * * * *